US012767539B2

(12) United States Patent
Seok et al.

(10) Patent No.: US 12,767,539 B2
(45) Date of Patent: Oct. 20, 2026

(54) METHOD OF IMPROVING AQUEOUS DISPERSIBILITY OF CONDUCTIVE CARBON POWDER, AND METHOD OF PREPARING COLLOID SOLUTION OF CONDUCTIVE CARBON POWDER

(71) Applicant: KOREA INSTITUTE OF FUSION ENERGY, Daejeon (KR)

(72) Inventors: Dong Chan Seok, Gunsan-si (KR); Yong Ho Jung, Seongnam-si (KR); Seung Ryul Yoo, Daejeon (KR)

(73) Assignee: KOREA INSTITUTE OF FUSION ENERGY, Daejeon (KR)

( * ) Notice: Subject to any disclaimer, the term of this patent is extended or adjusted under 35 U.S.C. 154(b) by 775 days.

(21) Appl. No.: 18/003,779

(22) PCT Filed: May 13, 2021

(86) PCT No.: PCT/KR2021/005982
§ 371 (c)(1),
(2) Date: Dec. 29, 2022

(87) PCT Pub. No.: WO2022/005014
PCT Pub. Date: Jan. 6, 2022

(65) Prior Publication Data
US 2023/0257269 A1 Aug. 17, 2023

(30) Foreign Application Priority Data
Jul. 1, 2020 (KR) ........................ 10-2020-0080726

(51) Int. Cl.
*C01B 32/168* (2017.01)
*B01J 19/08* (2006.01)
(Continued)

(52) U.S. Cl.
CPC ........... *C01B 32/174* (2017.08); *B01J 19/088* (2013.01); *C01B 32/194* (2017.08); *C01B 32/21* (2017.08); *C01P 2006/40* (2013.01)

(58) Field of Classification Search
CPC ..... C01B 31/174; C01B 31/194; C01B 31/21; C01B 32/174; C01B 32/194; C01B 32/21;
(Continued)

(56) References Cited

U.S. PATENT DOCUMENTS

| | | | | |
|---|---|---|---|---|
| 3,408,164 A * | 10/1968 | Johnson | B82Y 30/00 422/150 |
| 6,923,890 B2 * | 8/2005 | Ricatto | B01J 19/088 8/115.52 |

(Continued)

FOREIGN PATENT DOCUMENTS

| | | |
|---|---|---|
| JP | 2003300716 | 10/2003 |
| KR | 10-20050088554 | 9/2005 |

(Continued)

OTHER PUBLICATIONS

Written Decision on Registration issued in Counterpart Korean Application No. KR 10-2020-0080726, dated Aug. 31, 2022 (English translation provided).

(Continued)

*Primary Examiner* — Cam N. Nguyen
(74) *Attorney, Agent, or Firm* — NORTON ROSE FULBRIGHT US LLP

(57) ABSTRACT

The present invention relates to a method of improving aqueous dispersibility of conductive carbon powders, and to a method of preparing a colloid solution of conductive carbon powders. The present invention comprises a step of exposing conductive carbon powders to a plasma jet or reacting same with a plasma-treated reaction gas, wherein the step is characterized by reacting the plasma-treated
(Continued)

reaction gas (ionized gas) with the conductive carbon powders, and accordingly by using plasma, the aqueous dispersibility of the conductive carbon powders may be improved in a convenient manner.

12 Claims, 7 Drawing Sheets

(51) Int. Cl.

*C01B 32/174* (2017.01)
*C01B 32/194* (2017.01)
*C01B 32/21* (2017.01)
*C09C 1/46* (2006.01)
*C09C 1/56* (2006.01)
*H01B 1/04* (2006.01)

(58) Field of Classification Search

CPC ... C01B 32/168; B01J 19/088; C01P 2006/40; C09C 1/46; C09C 1/485; C09C 1/56; C09C 3/048; H01B 1/04
USPC .......................................................... 423/460
See application file for complete search history.

(56) References Cited

U.S. PATENT DOCUMENTS 7,594,989 B2 * 9/2009 Varadaraj ............... C10G 75/04 210/698
7,608,798 B2 * 10/2009 Kumar ................. H05B 6/6402 219/121.48
8,277,739 B2 * 10/2012 Monsen .................. C01B 32/18 422/186.21
10,188,119 B2 * 1/2019 Foret ....................... C02F 1/006
10,434,490 B2 * 10/2019 Strohm .................. B01J 19/088
11,192,789 B2 * 12/2021 Takai .................... C01B 32/174
11,358,113 B2 * 6/2022 Strohm .................. B01J 19/088
11,987,712 B2 * 5/2024 Hardman ............... B01J 19/088
12,286,540 B2 * 4/2025 Hardman ................ C09C 1/485
2011/0003109 A1 * 1/2011 Slinker ................... H01J 1/304 428/92
2012/0145041 A1 * 6/2012 Walters .................. B82Y 40/00 977/773
2014/0014495 A1 * 1/2014 Dickinson ............... C01B 32/19 204/157.64
2014/0248442 A1 * 9/2014 Luizi ...................... B82Y 40/00 118/716
2016/0354754 A1 * 12/2016 Hirson ..................... H05H 1/44

FOREIGN PATENT DOCUMENTS

KR 10-20090006912 1/2009
KR 10-20160021133 2/2016

OTHER PUBLICATIONS

International Search Report and Written Opinion issued in Corresponding PCT Application No. PCT/KR2021/005982, dated Oct. 1, 2021 (English Translation provided).
Trulli et al., "Towards highly stable aqueous dispersions of multi-walled carbon nanotubes: the effect of oxygen plasma functionalization." Journal of Colloid and Interface Science 2017, 491, pp. 255-264.

* cited by examiner (Left)Before treatment
(Right) After treatment

In 3 minutes

In 10 minutes

In 20 minutes

In 30 minutes

In 40 minutes

In 50 minutes

In 60 minutes

METHOD OF IMPROVING AQUEOUS DISPERSIBILITY OF CONDUCTIVE CARBON POWDER, AND METHOD OF PREPARING COLLOID SOLUTION OF CONDUCTIVE CARBON POWDER

CROSS-REFERENCE TO RELATED APPLICATIONS

This application is a national phase under 35 U.S.C. § 371 of International Application No. PCT/KR2021/005982 filed May 13, 2021, which claims the benefit of priority to Korean Patent Application No. 10-2020-0080726, filed Jul. 1, 2020, the entire contents of each of which are hereby incorporated by reference in their entirety.

FIELD OF THE INVENTION

The present disclosure relates to a method for improving hydrophilicity and water-dispersibility of conductive carbon powders using carbon dioxide plasma, and a method for preparing a colloidal solution of conductive carbon powders.

DESCRIPTION OF RELATED ART

A conductive carbon powder has excellent properties such as high electrical conductivity and oxidation resistance, and thus is applied to many fields. Since a surface thereof is lipophilic, the conductive carbon powder is mainly used together with a non-aqueous non-polar solvent. However, when the conductive carbon powder is used in fields such as secondary battery electrodes, paints, and printing inks and thus is used together with an aqueous solution, the powders must have high dispersibility in the aqueous solution. For this reason, a hydrophilic surface treatment on the powders are absolutely necessary.

A typical hydrophilic treatment method on the carbon powders are a chemical liquid treatment method. The method includes dipping and reacting the carbon powders in a treatment solution such as acetic acid, nitric acid, or hydrogen peroxide, such that a hydroxyl group or an amino group is bonded to the surfaces of the powders to impart a hydrophilic functional group to the surfaces thereof. However, this method has disadvantages in that it is not economically efficient because the surface treatment method is very complicated and requires many processes such as a purification process to remove residues and a drying process. In an alternative method, there is an ozone treatment method in which surface treatment is performed under an ozone gas atmosphere. However, this method has a problem in that the surface of the carbon powder is denatured due to the strong oxidizing property of ozone. Specifically, when only pure 100% $O_2$ (oxygen) is used, a high concentration of ozone is generated. Thus, when the generated ozone and the conductive carbon powders contact each other, the surface thereof deteriorates and burns.

SUMMARY OF THE INVENTION

One purpose of the present disclosure is to provide a method that may easily improve water-dispersibility of carbon powders using carbon dioxide plasma in a simple process.

Another purpose of the present disclosure is to provide a method for preparing a colloidal solution in which conductive carbon powders are stably well dispersed.

A method for improving water-dispersibility of conductive carbon powders to achieve one purpose of the present disclosure is a novel method that can very easily improve the water-dispersibility of conductive carbon powders compared to the prior art. The method for improving water-dispersibility of conductive carbon powders according to the present disclosure can improve the water-dispersibility of conductive carbon powders very easily via a simple process of only exposing the conductive carbon powders to a plasma jet or reacting with a plasma-treated reaction gas. In other words, the method for improving water-dispersibility of conductive carbon powders according to the present disclosure may only react the conductive carbon powders with the plasma-treated active gas to exhibit the effect of significantly improving the water-dispersibility of the conductive carbon powders.

In accordance with the present disclosure, it is characterized in that the plasma-treated gas is transferred to an area in which the conductive carbon powders are disposed and is exposed to and reacts with the conductive carbon powder, rather than placing the conductive carbon powders in a plasma generation area so as to directly expose to and react with the generated plasma. In this regard, the plasma jet is obtained by ejecting the plasma generated in the plasma generation region into the air in a jet shape.

In general, plasma treatment means placing and reacting an object to be treated in a plasma generating region so as to react with the plasma. In accordance with the present disclosure, plasma treatment does not refer to a scheme in which carbon powders are placed in a plasma generating region so as to be directly exposed to the plasma but refers to a scheme in which carbon powders are exposed to and react with the plasma-treated ionized gas. Although it may be considered that a more effective method is to place the conductive carbon powders in the plasma generation area and directly expose and react to and with the plasma. The present applicant has experimentally identified a problem in which when the carbon powders are directly exposed to the plasma generating region, defects occurred in the carbon powders due to a reaction between the carbon powders and the plasma. Therefore, in accordance with the present disclosure, a process of exposing the conductive carbon powders to a plasma jet or reacting the conductive carbon powders with a plasma-treated reaction gas may be used to modify the properties of the conductive carbon powders very stably without causing the defects.

The conductive carbon powder that may be used in accordance with the present disclosure may be made of a material composed only of carbon atoms. For example, the conductive carbon powder may be made of graphene, graphite, carbon nanotube (TNT), carbon black, Ketjen black, and Denka black. According to the present disclosure, a size or a shape of the conductive carbon powder is not limited in a specific manner. Preferably, each of the conductive carbon powders may have a particle size of several nanometers to several hundreds of micrometers. However, even when each of the conductive carbon powders has a size larger or smaller than the above defined range, there is no problem in performing the method of the present disclosure. Further, each of the conductive carbon powders may have a shape such as a sphere, a tetrahedron, a cube, an octahedron, and the like, but is not necessarily limited thereto.

The plasma may be carbon dioxide plasma. In general, plasma may be generated using a mixed gas in which materials such as oxygen, nitrogen, and hydrogen are mixed with each other in a specific ratio. However, the present applicant has identified that using 100% carbon dioxide plasma allowed the water-dispersibility of the carbon powders to be significantly improved, compared to the case of using oxygen or nitrogen gas or mixed gas for generating the plasma. When using the mixed gas for generating the plasma, water-dispersibility of the carbon powders is achieved. However, when using the mixed gas for generating the plasma, a colloidal state in which the carbon powders are dispersed in a water-based solvent cannot be stably maintained. However, in accordance with the present disclosure, when using 100% carbon dioxide plasma, a colloidal state in which the carbon powders are dispersed in a water-based solvent can be stably maintained. A difference between a time duration for which the colloidal state lasts when using the mixed gas for generating the plasma and a time duration for which the colloidal state lasts when using 100% carbon dioxide plasma is significant. Details thereof will be described in detail through Present Examples and Comparative examples.

A method for generating the plasma may use dielectric barrier discharge, corona discharge, microwave discharge, and arc discharge. Preferably, the dielectric barrier discharge (DBD) plasma may be used. However, the present disclosure is not necessarily limited thereto.

The plasma treatment may be performed for 10 to 30 minutes. In accordance with the present disclosure, the plasma treatment time is not limited to a specific value as long as it is sufficient to impart dispersibility while not causing denaturation or scratches on the surface of the conductive carbon powder.

In general, conventional conductive carbon powders are used in many applications. The conductive carbon powders should be dispersed in a water-based solvent for application thereof. However, when the carbon powder is not subjected to a surface treatment process, the carbon powders aggregate with each other due to the hydrophobic nature of the carbon powder. The physical agitation may not improve the dispersibility. Therefore, the surface treatment process should be performed on the conductive carbon powders. However, there are problems in that the surface treatment process is complicated or the carbon powders are very easily broken.

The colloid production method of the present disclosure is a method for solving these problems and includes exposing conductive carbon particles to a plasma jet or reacting the same with a plasma-treated reaction gas to obtain conductive carbon colloidal powders, and adding the obtained conductive carbon colloidal powders to a water-based solvent and stirring the conductive carbon colloidal powders to prepare the conductive carbon powder colloidal solution. The conductive carbon colloidal powders obtained by reacting the conductive carbon particles with the plasma is merely added to the water-based solvent, and is not stirred such that the conductive carbon colloidal powders are dispersed therein to some extent. A stably dispersed colloidal solution without aggregation of the powders may be prepared via simple agitation (hand shaking) of a sealed container containing the colloidal powders and the water-based solvent.

According to the present disclosure, the carbon dioxide plasma treatment may stably improve the water-dispersibility of carbon powders without causing the defects thereon. The carbon powders subjected to the carbon dioxide plasma treatment may be continuously and stably dispersed in a water-based solvent, and thus may have physical properties according to excellent water-dispersibility and thus may be applied to various fields.

DETAILED DESCRIPTION OF THE INVENTION

Figure 1:
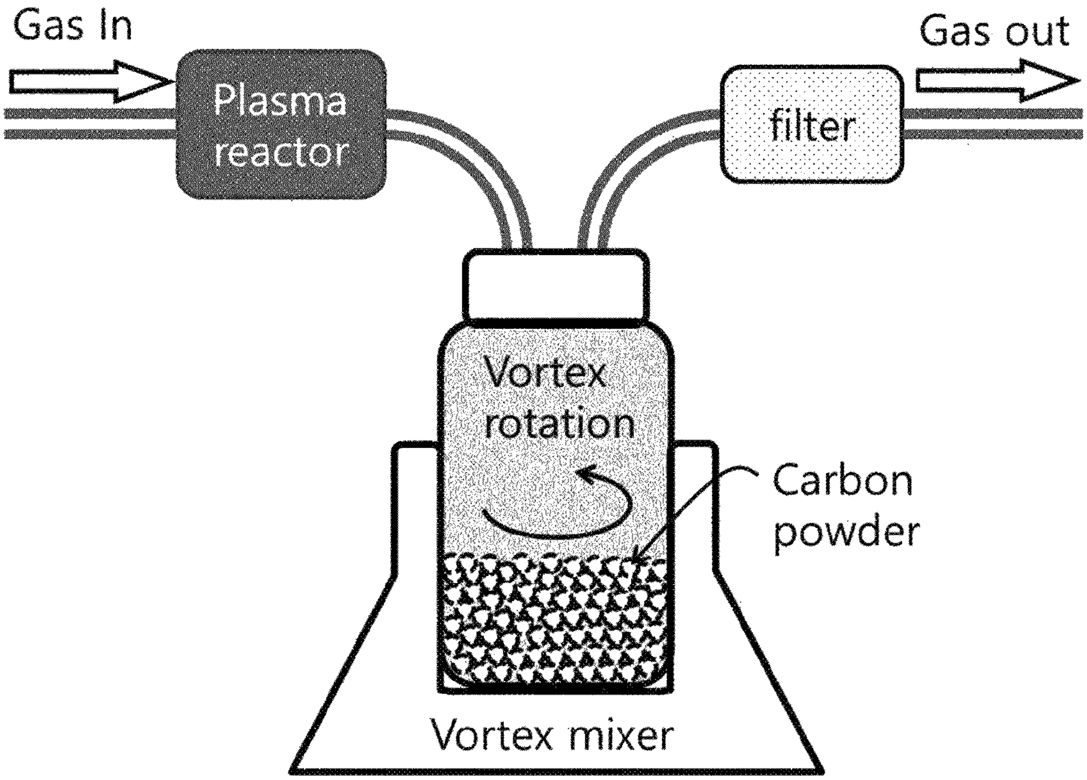
FIGS. 1 and 2 are views for illustrating a method for improving the water-dispersibility of the conductive carbon powders and a method for preparing a colloidal solution of the conductive carbon powders of the present disclosure.

Hereinafter, an embodiment of the present disclosure will be described in detail with reference to the accompanying drawings. The present disclosure may be variously modified and may take many forms. Thus, specific embodiments will be illustrated in the drawings and described in detail herein. However, the specific embodiments are not intended to limit the present disclosure thereto. It should be understood that all changes, equivalents thereto, or substitutes therewith are included in a scope and spirit of the present disclosure. In describing the drawing, similar reference numerals are used for similar components.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
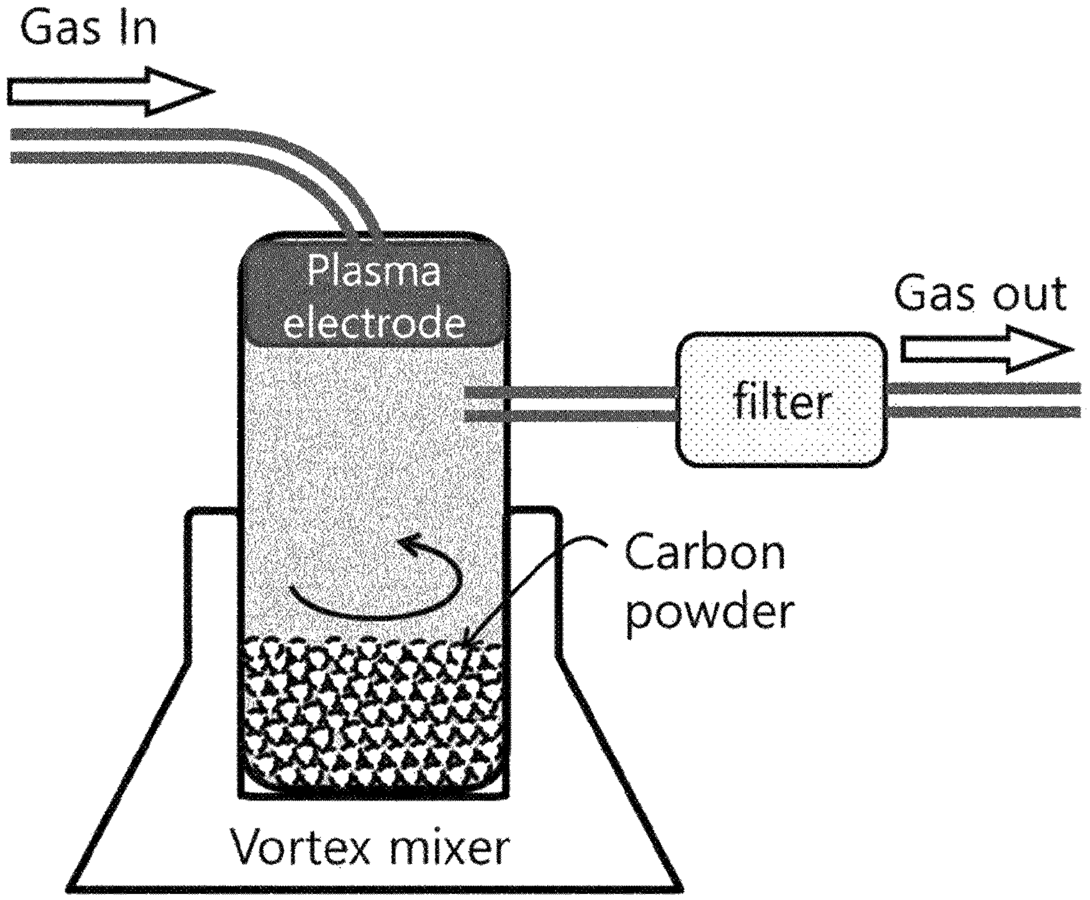

FIGS. 1 and 2 are views for illustrating a method for improving the water-dispersibility of the conductive carbon powders and a method for preparing a colloidal solution of the conductive carbon powders of the present disclosure.

Referring to FIGS. 1 and 2, each of the method for improving the water-dispersibility of conductive carbon powders and the method for preparing a colloidal solution of conductive carbon powders in the present disclosure may include exposing the conductive carbon powders to a plasma jet or reacting with a plasma-treated reactive gas. The plasma jet means ejecting the plasma generated in a plasma generating region into the air in a jet shape. In accordance with the present disclosure, the above step is characterized in that the conductive carbon powders are not directly exposed to and reacted with the generated plasma, but react with a plasma-treated active gas. When the conductive carbon powders are placed in the plasma generation area and reacts directly with the plasma, the generated plasma reacts with the conductive carbon powder, such that the carbon powders are prone to have defects. Therefore, in accordance with the present disclosure, the conductive carbon powders react with a plasma-treated reactive gas or activated gas, rather than with the generated plasma.

Referring to FIG. 1, a plasma treatment method of the conductive carbon powders in which the conductive carbon powders reacts with the plasma-treated reaction gas is shown. To describe this method in detail, first, a plasma generating gas is injected into a plasma reactor, and then plasma is generated therein. The plasma-treated reaction gas or ionized gas is injected to a container in which the conductive carbon powders are received and reacted with the carbon powder. In this regard, the reaction may be performed via vortex rotation.

Next, referring to FIG. 2, another plasma treatment method of the conductive carbon powders will be described. Referring to FIG. 2, the water-dispersibility of the carbon powders may be improved by exposing the conductive carbon powders to the plasma jet. In this regard, the plasma may include dielectric barrier discharge (DBD) plasma, and a plasma electrode may include two parallel metal electrodes. When a current is applied to the metal electrodes, plasma is generated between the parallel electrodes. The plasma-treated reaction gas or ionized gas is ejected toward the carbon powders, and thus reacts with the carbon powders.

A shape and a size of each of the conductive carbon powders are not particularly limited. Each of the conductive carbon powders may have a size of several tens of nanometers or may have a spherical shape.

In one example, the plasma may be carbon dioxide plasma. Preferably, the plasma may be 100% carbon dioxide plasma. When 100% carbon dioxide plasma gas is used, the water-dispersibility of the carbon powders may be effectively improved, compared to a case where a mixed gas containing nitrogen and oxygen is used.

During the above step, the reaction gas treated with the carbon dioxide plasma may be ionized to generate CO and $CO_3$ radicals, which in turn may react with the surfaces of the conductive carbon powders. Thus, hydrophilic functional groups such as C—O, C═O, and C—OOH may bind to the surfaces of the conductive carbon powders. Therefore, in this process, the conductive carbon powders treated with plasma according to the method of the present disclosure may exhibit hydrophilicity. This may improve the water-dispersibility of the conductive carbon powder.

A reaction time between the plasma and the carbon powder, that is, the plasma treatment time may be in a range of about 10 to 30 minutes. However, in accordance with the present disclosure, as long as it is sufficient to impart dispersibility to the conductive carbon powders while denaturation and defects do not occur on the surface of the conductive carbon powder, the plasma treatment time is not limited to a specific time.

A carbon powder colloidal solution may be prepared by adding the carbon powders treated with the plasma via the above step to a water-based solvent and stirring the mixed solution. Unlike the non-plasma-treated carbon powder, the plasma-treated carbon powders may be dispersed in the water-based solvent immediately after being added to the water-based solvent. Further, the colloidal solution in which the powders are more effectively dispersed may be prepared by stirring the mixed solution. The stirring scheme is not limited to a specific scheme as long as the scheme can disperse the carbon powders in the solvent. For example, the stirring may be performed using a magnetic bar. Various schemes such as rotary or vertical reciprocating stirring may be used.

According to the present disclosure, the method using the plasma may impart water-dispersibility and hydrophilicity to the conductive carbon powders in an easier way than a conventional method. This method may be effectively applied to fields where conductive carbon powders are applied.

Hereinafter, the present disclosure will be described in more detail through specific Present Examples and Comparative examples. However, Present Examples of the present disclosure are merely some embodiments of the present disclosure, and the scope of the present disclosure is not limited to the following Present Examples.

PRESENT EXAMPLE

Figure 3:
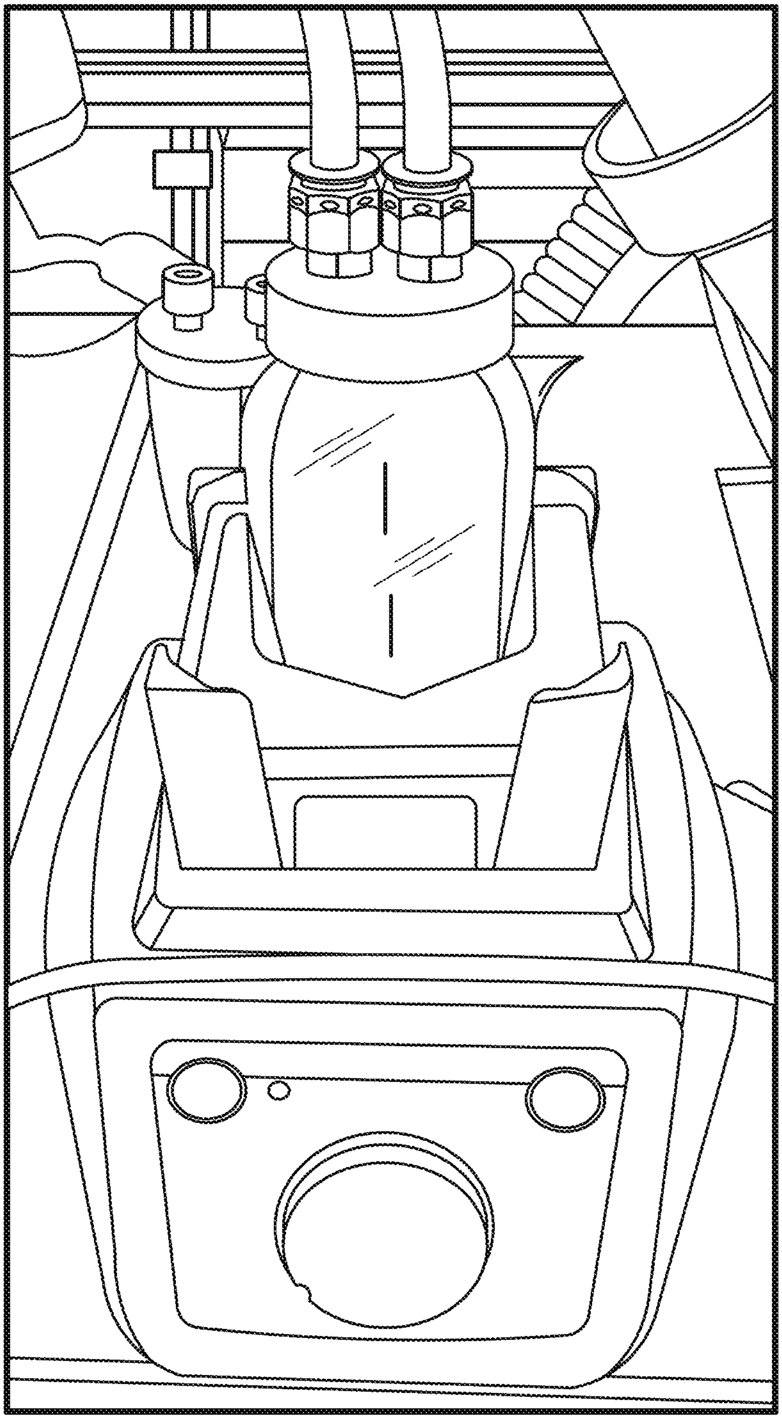
FIG. 3 is a diagram for illustrating Present Example of the present disclosure.

FIG. 3 is a diagram for illustrating Present Example of the present disclosure.

Referring to FIG. 3, according to Present Example of the present disclosure, conductive carbon powders (Ketjen black, KB 600 JD) having a size of about 30 to 40 nm were input into a reactor. 100% $CO_2$ plasma was generated using a plasma activated gas generator (30 Hz, 0.8 kW, 1 lpm of $CO_2$ gas) using a multi-stage DBD electrode. Then, the generated $CO_2$ plasma was transferred to a reaction chamber, in which the conductive carbon powders and the generated $CO_2$ plasma reacted with each other for about 30 minutes. Thereafter, the conductive carbon powders obtained through the reaction were obtained.

In order to identify the water-dispersibility of the plasma-treated conductive carbon powder, the powders were added to a container filled with water. For comparison, non-plasma-treated conductive carbon powders were added to a container filled with water to identify water-dispersibility thereof. The results are shown in FIG. 4.

Figure 4:
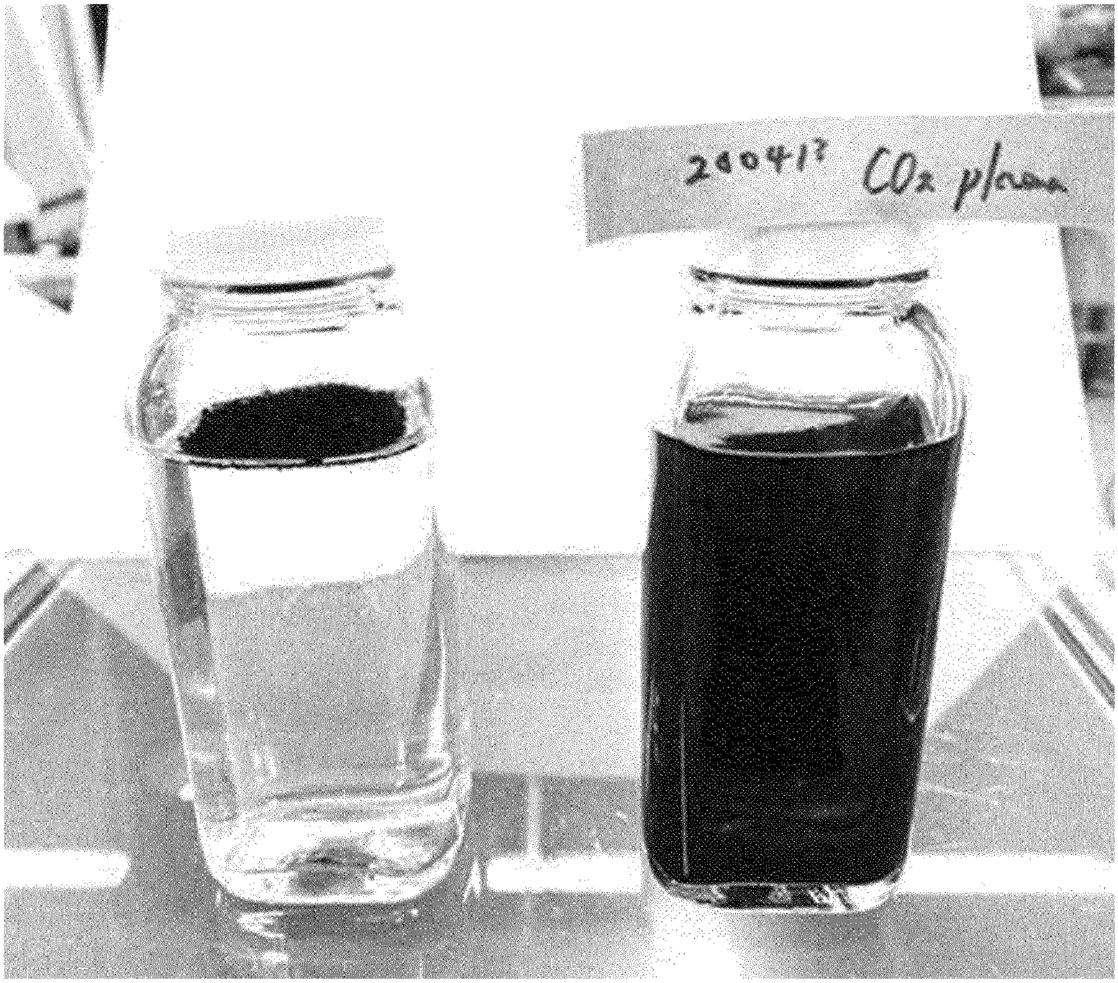
FIG. 4 is a view showing an image of a state immediately after putting the carbon powders prepared according to Present Example of the present disclosure into water.

Referring to FIG. 4, a state immediately after putting the conductive carbon powders into water is shown. In FIG. 4, it may be identified that the non-plasma-treated carbon powders are not dispersed in and floats on water (in a left container) whereas the plasma-treated carbon powders are well dispersed in water as a solvent (a right container). Thus, it may be identified that the water-dispersibility of the carbon powders are improved based on the $CO_2$ plasma treatment.

Subsequently, each of the containers containing the carbon powders was physically agitated (Hand Shaking), and water-dispersibility thereof was identified. The results are shown in FIG. 5.

Figure 5:
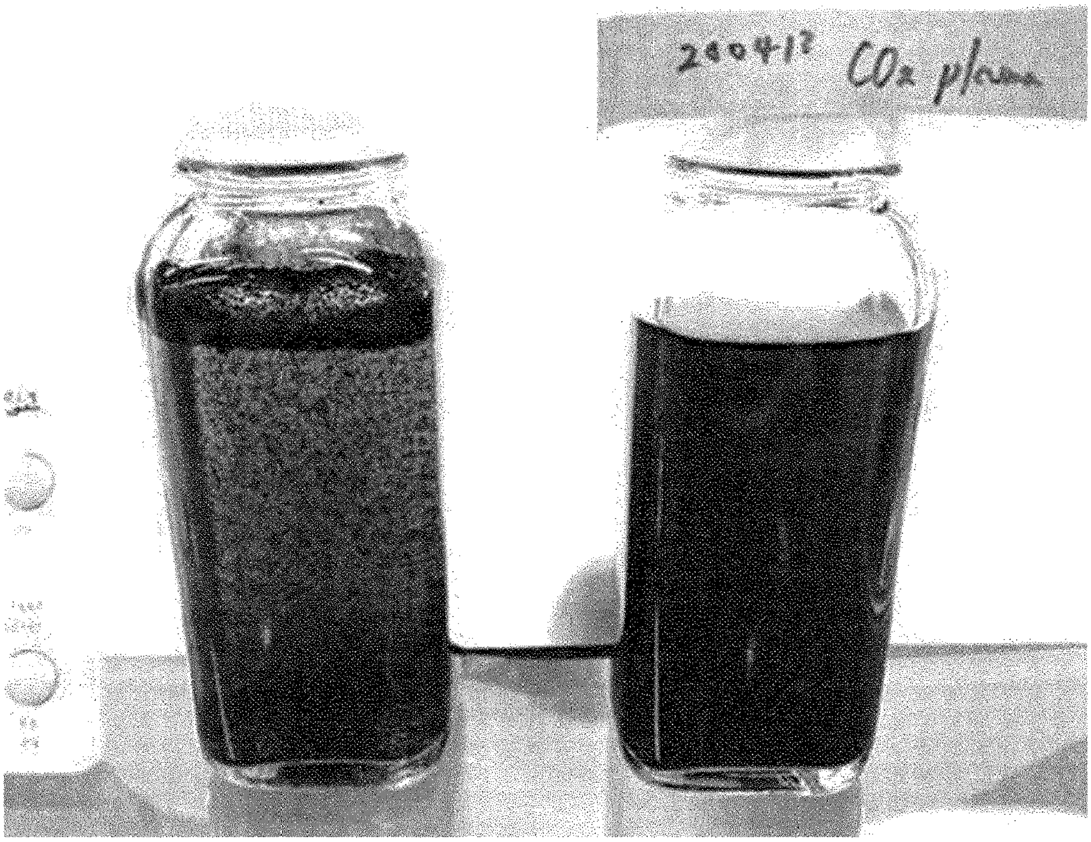
FIG. 5 is a view showing an image taken after adding the carbon powders prepared according to Present Example of the present disclosure to water and stirring the mixed solution by applying physical force thereto.

Referring to FIG. 5, it may be identified that the carbon powders (left) that has not been treated with the plasma floats on water or is not easily dispersed therein, whereas the plasma-treated carbon powders (right) are well dispersed in water as a solvent while the carbon powders do not settle on to bottom of the container or do not float on the water.

In order to identify the water-dispersibility persistence characteristic of the plasma-treated conductive carbon powders over time, the plasma-treated conductive carbon powders were added to a container containing water as a solvent. After physically dispersing the powders by applying a physical force to water (via hand shaking), layer separation over time (3, 10, 20, 30, 40, 50 and 60 minutes) was photographed. Further, for comparison, conductive carbon powders that was not plasma-treated was subjected to the same process as the above process to photograph the layer separation. The results are shown in FIG. 6.

Figure 6:
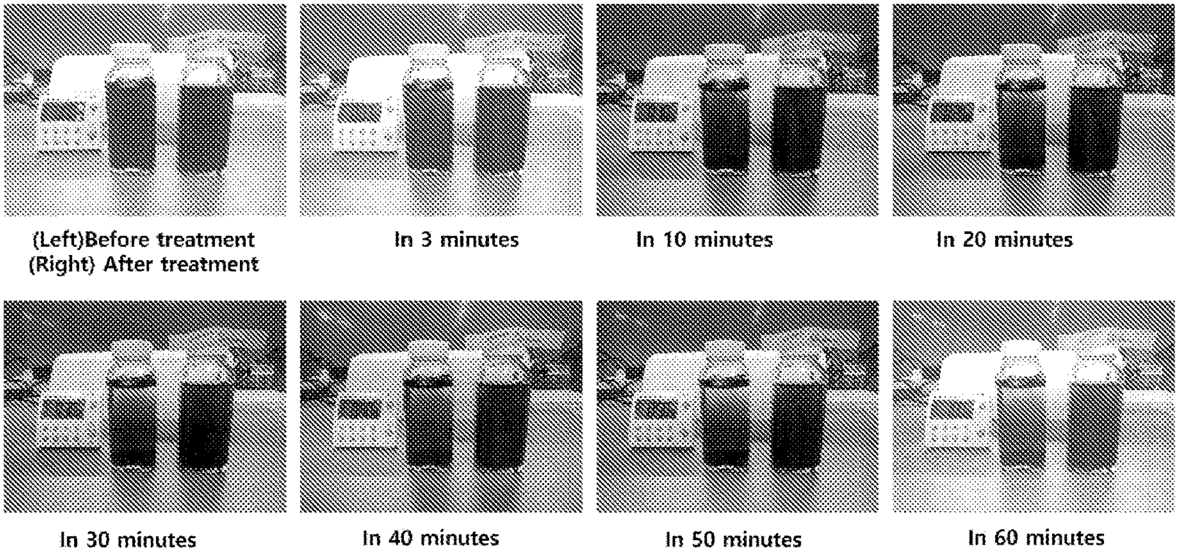
FIG. 6 is a diagram showing test results of water-dispersibility safety characteristics over time of the carbon powders prepared according to Present Example of the present disclosure. It may be identified that plasma-treated conductive carbon powders are stably dispersed in water after 60 minutes have elapsed.

Referring to FIG. 6, it may be identified that the plasma-treated conductive carbon powders are stably dispersed in the water after 60 minutes have elapsed. It may be identified that after stirring the non-plasma-treated conductive carbon powder, some carbon powders float on the water. After about 10 minutes have elapsed, the dispersed non-plasma-treated conductive carbon powders begin to sink to the bottom. It may be identified that after about 60 minutes have elapsed, a significant portion of the carbon powders has not been dispersed in water and has sunk to the bottom. Thus, it may be identified that water-dispersibility of the conductive carbon powders treated with the plasma according to the method of the present disclosure is stably maintained over time.

COMPARATIVE EXAMPLE

The same process as that in Present Example of the present disclosure is performed except for using nitrogen ($N_2$)/air mixed gas plasma ($N_2$/air is 1/0.033 lpm, and a concentration of oxygen in the mixed gas is 0.66%). Thus, plasma-treated carbon powders according to the Comparative Example of present disclosure were obtained. In order to identify the water-dispersibility characteristics of the conductive carbon powders as obtained above, layer separation over time (10 and 30 minutes) after dispersing the conductive carbon powders in water was photographed. The results are shown in FIG. 7.

Figure 7:
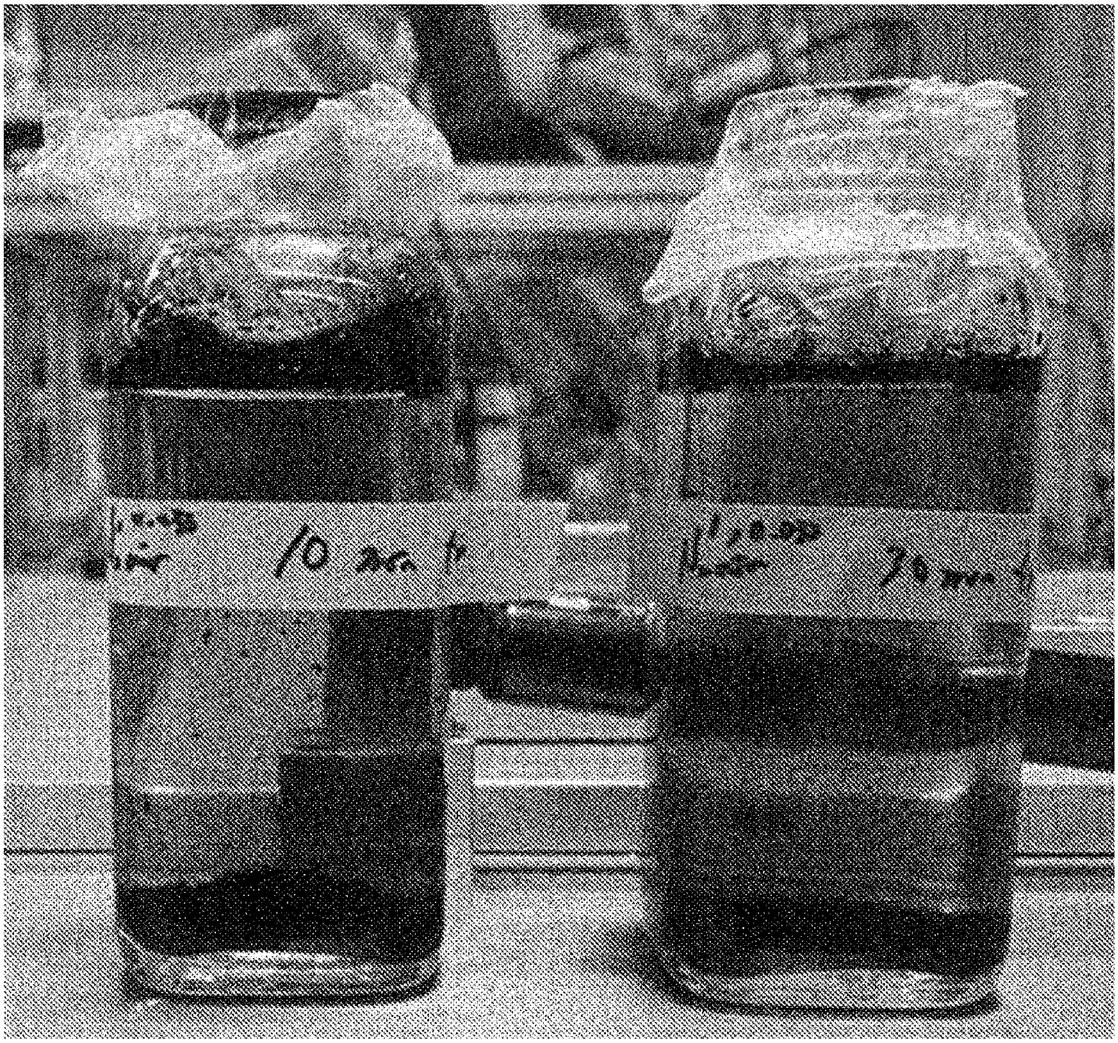
FIG. 7 is a diagram showing the results of the water-dispersibility characteristics of Comparative Example as prepared using mixed gas plasma of the present disclosure.

Referring to FIG. 7, the colloidal solution after 10 minutes is shown at a left side, and the colloidal solution after 30 minutes is shown at a right side. It may be identified that only a small amount of carbon powders was dispersed in the water in the colloidal solution, while most of the carbon powders were settled to the bottom or floated on the water. In addition, it may be identified based on a comparing result between FIG. 6 and FIG. 7 that the layer separation rate of the carbon powders treated with the mixed gas plasma is much higher than the layer separation rate of the carbon powders treated with the carbon dioxide plasma over time. Thus, it may be identified that when the carbon powders are treated with the plasma generated using the mixed gas, the carbon powders have no water-dispersibility and water-dispersibility thereof fails to last.

Additionally, the layer separation rate was specifically identified based on a measuring result of the light absorbance over time of the plasma-treated conductive carbon powder. For comparison, the layer separation rate of the non-plasma-treated conductive carbon powders was also measured and compared with the layer separation rate of the plasma-treated conductive carbon powders. A device used to measure the layer separation rate is shown in FIG. 8, and the optical absorbance measurement is described in detail with reference to FIG. 8.

Figure 8:
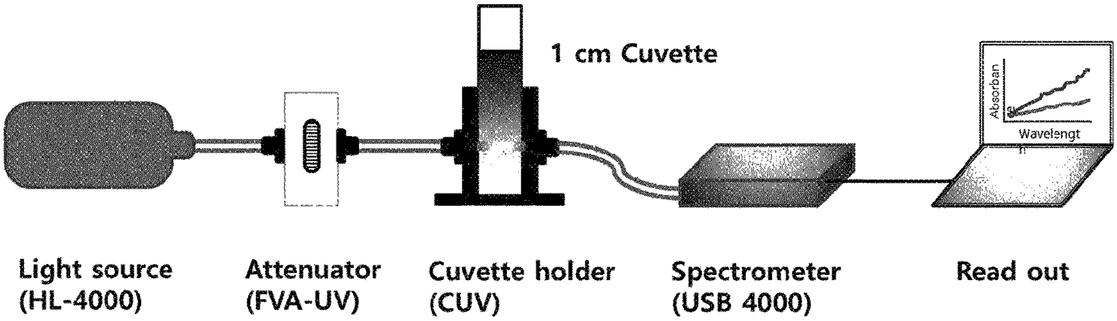
FIG. 8 is a diagram for illustrating a layer separation rate experiment of carbon powders prepared according to Present Example of the present disclosure.

Referring to FIG. 8, the $CO_2$ plasma-treated carbon powders were injected into water, and then layer separation thereof over time was measured based on the optical absorbance using an optical emission spectrometer (OES). The non-plasma-treated carbon powders were injected into water, and then layer separation thereof over time was measured based on the optical absorbance using an optical emission spectrometer (OES). Ten average values of the optical absorbance were obtained in a 550 to 700 nm wavelength band at a height of about 1 cm from a bottom of a cuvette. The results are shown in FIG. 9.

Figure 9:
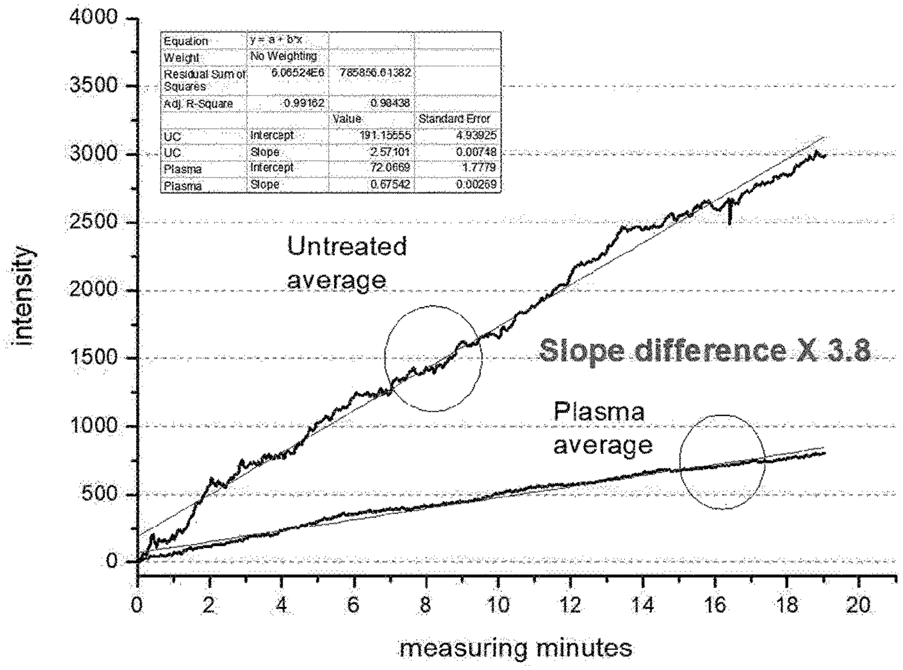
FIG. 9 is a graph showing a result 1 of the layer separation rate experiment of carbon powders prepared according to Present Example of the present disclosure. It may be identified that the layer separation rate of the plasma-treated carbon powders are reduced by about 3 to 4 times compared to that of the untreated carbon powders.

Referring to FIG. 9, it may be identified that the layer separation rate of the plasma-treated carbon powders is lowered by about 3 to 4 times compared to that of the untreated carbon powders (Untreated). Thus, it may be identified that when the conductive carbon powders are treated using the method of the present disclosure, the conductive carbon powders can be continuously dispersed while the layer separation does not occur after being dispersed in the solvent.

Although the present disclosure has been described above with reference to the preferred embodiment of the present disclosure, those skilled in the art will understand that the present disclosure may be modified and changed in various ways without departing from the spirit and scope of the present disclosure as described in the claims below.

What is claimed is:

1. A method for treating a conductive carbon powder, the method comprising:
- (a) subjecting a gas having 100% carbon dioxide ($CO_2$) to a plasma reactor to obtain a plasma-treated reaction gas; and
- (b) injecting the plasma-treated reaction gas from (a) into a reaction container comprising the conductive carbon powder to obtain a treated carbon powder,
- wherein the plasma reactor and the reaction container are separated such that the conductive carbon powder is not exposed to the plasma reactor in (a),
- wherein the treated carbon powder has increased water dispersibility when compared with the conductive carbon powder, and
- wherein the plasma-treated reaction gas comprises carbon monoxide (CO) and carbon trioxide ($CO_3$) radicals.

2. The method of claim 1, wherein step (b) is performed for 10 to 30 minutes.

3. The method of claim 1, wherein the conductive carbon powder includes graphene, graphite, carbon nanotube (TNT), carbon black, Ketjen black, or Denka black.

4. The method of claim 1, wherein the treated carbon powder comprises a hydrophilic functional group that includes C—O, C=O, or C—OOH.

5. A method for treating a conductive carbon powder, the method comprising:
- (a) subjecting a gas having 100% carbon dioxide ($CO_2$) to a plasma reactor to obtain a plasma-treated reaction gas; and
- (b) injecting the plasma-treated reaction gas from (a) into a reaction container comprising the conductive carbon powder to obtain a treated carbon powder,
- wherein the plasma reactor and the reaction container are separated such that the conductive carbon powder is not exposed to the plasma reactor in (a), wherein the treated carbon powder has increased water dispersibility when compared with the conductive carbon powder, and wherein the plasma reactor is dielectric barrier discharge (DBD) plasma reactor.

6. The method of claim 5, wherein step (b) is performed for 10 to 30 minutes.

7. The method of claim 5, wherein the conductive carbon powder includes graphene, graphite, carbon nanotube (TNT), carbon black, Ketjen black, or Denka black.

8. A method for preparing a carbon powder colloidal solution, the method comprising:

a first step of exposing carbon particles to a plasma jet or reacting with a plasma-treated reaction gas to obtain conductive carbon colloidal powders; and a second step of adding the conductive carbon colloidal powders to a solvent comprising water and stirring the conductive carbon colloidal powders to obtain the carbon powder colloidal solution.

9. The method of claim 8, wherein the plasma is carbon dioxide plasma.

10. The method of claim 8, wherein the plasma is dielectric barrier discharge (DBD) plasma.

11. The method of claim 8, wherein the plasma treatment is performed for 10 to 30 minutes.

12. The method of claim 8, wherein the conductive carbon particles includes graphene, graphite, carbon nanotube (TNT), carbon black, Ketjen black, or Denka black.

* * * * *